(12) United States Patent
Wakabayashi et al.

(10) Patent No.: US 9,278,295 B2
(45) Date of Patent: *Mar. 8, 2016

(54) HEAT INTEGRATED DISTILLATION APPARATUS

(71) Applicant: TOYO ENGINEERING CORPORATION, Chiyoda-ku (JP)

(72) Inventors: Toshihiro Wakabayashi, Narashino (JP); Takato Nakao, Narashino (JP)

(73) Assignee: TOYO ENGINEERING CORPORATION, Tokyo (JP)

(*) Notice: Subject to any disclaimer, the term of this patent is extended or adjusted under 35 U.S.C. 154(b) by 239 days.

This patent is subject to a terminal disclaimer.

(21) Appl. No.: 13/771,741

(22) Filed: Feb. 20, 2013

(65) Prior Publication Data

US 2013/0213792 A1 Aug. 22, 2013

(30) Foreign Application Priority Data

Feb. 20, 2012 (JP) ................................. 2012-033978

(51) Int. Cl.
B01D 3/00 (2006.01)
B01D 1/28 (2006.01)
B01D 3/14 (2006.01)

(52) U.S. Cl.
CPC  *B01D 3/007* (2013.01); *B01D 1/28* (2013.01); *B01D 3/141* (2013.01); *B01D 3/143* (2013.01)

(58) Field of Classification Search
CPC ........ B01D 3/007; B01D 3/141; B01D 3/143; B01D 3/322; B01D 3/324; B01D 1/28; B01D 1/2846; B01D 1/2856

USPC ........ 202/154, 158, 172, 182; 203/26, 71, 98, 203/DIG. 8

See application file for complete search history.

(56) References Cited

U.S. PATENT DOCUMENTS

| 3,575,007 | A | * | 4/1971 | Gunther | 62/620 |
| 4,234,391 | A | * | 11/1980 | Seader | 203/26 |
| 4,277,268 | A | * | 7/1981 | Spangler, Jr. | 62/630 |
| 4,539,076 | A | * | 9/1985 | Swain | 202/154 |
| 4,737,177 | A | * | 4/1988 | Erickson | 62/646 |
| 4,961,826 | A | * | 10/1990 | Grethlein et al. | 203/19 |
| 5,351,492 | A | * | 10/1994 | Agrawal et al. | 62/648 |
| 5,435,436 | A | * | 7/1995 | Manley et al. | 203/74 |

(Continued)

FOREIGN PATENT DOCUMENTS

| JP | 2004-016928 | 1/2004 |
| JP | 2011-078872 | 4/2011 |

*Primary Examiner* — Duane Smith
(74) *Attorney, Agent, or Firm* — Knobbe Martens Olson & Bear LLP

(57) ABSTRACT

A distillation apparatus includes a rectifying column, a stripping column, a first pipe that communicates a column top of the stripping column with a column bottom of the rectifying column, and a compressor configured to compress vapor from the stripping column and then to feed the compressed vapor to the rectifying column. The distillation apparatus further includes a heat exchanger located at a predetermined stage of the rectifying column, a liquid withdrawal unit located at a predetermined stage of the stripping column and configured to withdraw a part of liquid from the predetermined stage to an outside of the column, a second pipe that introduces the liquid from the liquid withdrawal unit to the heat exchanger, and a third pipe that introduces fluids introduced through the second pipe to the heat exchanger and then discharged out of the heat exchanger to a stage directly below the liquid withdrawal unit.

6 Claims, 4 Drawing Sheets

(56) References Cited

U.S. PATENT DOCUMENTS

| | | | |
|---|---|---|---|
| 5,737,940 A * | 4/1998 | Yao et al. | 62/620 |
| 5,783,047 A * | 7/1998 | Aso et al. | 202/154 |
| 6,045,660 A * | 4/2000 | Savage et al. | 202/172 |
| 6,348,137 B1 * | 2/2002 | Nommensen | 203/49 |
| 6,605,190 B1 * | 8/2003 | Salamon et al. | 203/1 |
| 7,824,542 B2 * | 11/2010 | Menzel | 208/341 |
| 7,972,423 B2 * | 7/2011 | Jensen | 96/234 |
| 8,002,952 B2 * | 8/2011 | Sechrist | 202/153 |
| 2008/0135396 A1 * | 6/2008 | Blum | 203/25 |

* cited by examiner

Prior Art

Prior Art

HEAT INTEGRATED DISTILLATION APPARATUS

This application is based upon and claims the benefit of priority from Japanese patent application No. 2012-033978, filed on Feb. 20, 2012, the disclosure of which is incorporated herein in its entirety by reference.

BACKGROUND OF THE INVENTION

1. Field of the Invention

The present invention relates to a distillation apparatus that carries out a distillation operation widely applied to many industrial processes, and more particularly to a heat integrated distillation apparatus.

2. Description of the Related Art

Distillation separation is a unit operation widely applied to industrial processes in general, but consumes a large amount of energy. In the industrial field, therefore, studies have been conducted on an energy saving distillation systems. Such studies have brought about development of a heat integrated distillation column (hereinafter, HIDiC) as a distillation apparatus that save much energy.

As shown in FIG. 1, a basic system of the HIDiC has a structure where a rectifying section (high-pressure unit) and a stripping section (low-pressure unit) are provided such that they are separate from each other. Operation pressure of the rectifying section is set higher than that of the stripping section so that the operation temperature of the rectifying section can be higher than that of the stripping section. This enables a reduction in the amount of heat that is supplied to a reboiler because heat transfer occurs from the rectifying section to the stripping section when there is a heat-exchange surface therebetween. Heat of the rectifying section moves to the stripping section, and hence the amount of heat that is supplied at a reboiler can be reduced. As a result, high energy saving distillation apparatus can be achieved.

In order to put the concept of HIDiC to practical use, a number of distillation apparatuses having double-pipe structures, that is, double-pipe structures constituted of inner pipes forming rectifying sections and outer pipes forming stripping sections (refer to JP2004-16928A) have been proposed. These configurations are described as being capable of reducing the amounts of heat that are supplied to the reboilers and the amounts of heat that are removed at the condensers, since heat transfer occurs from the rectifying sections (inner pipes) to the stripping sections (outer pipes).

However, the heat integrated distillation apparatus having the rectifying section and the stripping section formed into the double-pipe structures as discussed in Patent Literature 1 had the following problems 1) to 6).

1) The product cannot be obtained with side-cut stream. The side-cutting means that a product is withdrawn as an intermediate distillate product, during a distillation process until an end distillate is acquired from top of column.

In the distillation apparatus described in JP2004-16928A, the tube units of the double-pipe structures are arranged to come into contact with each other. Moreover, the outer pipes and the inner pipes are equipped with the structured packing. As a result, no pipe arrangement can be formed to withdraw any intermediate distillate product from the inner pipe of each tube unit. Consequently, the structure disables side-cutting.

2) The feed stage where feed stream is provided cannot be optimized. This is because in the rectifying section and the stripping section formed into the double-pipe structures, packing heights thereof are equal, disabling free setting of the number of stages of the rectifying section and the stripping section.

3) The feed stage cannot be changed so as to meet the feed stream composition. This is because of the structure where free setting of the feeding stage position is disabled as described in 2).

4) Multi-feed stream (reception of a plurality of feed streams) cannot be dealt with. This is because of the structure where no feed stream can be supplied in the midway of the double-pipes as described in 1).

5) Maintenance of the apparatus is difficult. The tube units that use the structured packing are densely arranged to be adjacent to each other as described in 1). This disables complete access to the desired tube unit, and maintenance thereof cannot be carried out.

6) The heat exchanged rate between the rectifying section and the stripping section that uses double-pipes and in which there is no a degree of freedom in design for designing the heat transfer area, depends only on the temperature profile of the distillation column. Hence, in apparatus design, a degree of freedom in design of heat exchanged rate is small.

Q, the heat exchanged rate between the rectifying section and the stripping section, is represented by $Q = U \times A \times \Delta T$, where U is an overall heat-transfer coefficient, A is a heat transfer area, and $\Delta T$ is a temperature difference between the rectifying section and the stripping section. In the HIDiC using the double-pipe structure, an inner pipe wall surface becomes a heat transfer area. This heat transfer area has a fixed value determined by a structure of the double-pipes. The overall heat-transfer coefficient also has a fixed value determined by the heat transfer structure and fluid physical properties involved in heat exchange. Thus, as can be understood from the heat exchanged rate formula, a heat exchanged rate on design specification can be changed based only on the temperature difference between the rectifying section and the stripping section, which is changed by the operating pressure of the rectifying section and the stripping section.

As the heat integrated distillation apparatus that can solve the problem as described above, the present applicant has proposed the apparatus of JP4803470B.

FIG. 2 shows an example of the distillation apparatus disclosed in JP4803470B. The distillation apparatus includes rectifying column 1, stripping column 2 located higher than rectifying column 1, first pipe 23 for communicating column top 2c of the stripping column with column bottom 1a of the rectifying column, and compressor 4 configured to compress vapor from column top 2c of the stripping column to feed the compressed vapor to column bottom 1a of the rectifying column. The distillation apparatus further includes tube-bundle-type heat exchanger 8 located at a predetermined stage of rectifying column 1, liquid withdrawal unit 2d located at a predetermined stage of stripping column 2 and configured to withdraw a part of liquid from the predetermined stage to the outside of the column, second pipe 24 for introducing the liquid from liquid withdrawal unit 2d to heat exchanger 8, and third pipe 25 for introducing fluids introduced through second pipe 24 to heat exchanger 8 and then discharged out of heat exchanger 8 to a stage directly below liquid withdrawal unit 2d.

In the heat integrated distillation apparatus according to the constitution of the present invention, the fluids flow from stripping column 2 to heat exchanger 8 of rectifying column 1 through second pipe 24. Heat is removed from the vapor of rectifying column 1 in heat exchanger 8. Then, the heat can be transferred from rectifying column 1 to stripping column 2 through third pipe 25. The fluids flow from stripping column 2 to rectifying column 1 by gravity. The fluids in heat exchanger 8 are accordingly pushed to flow from rectifying column 1 to stripping column 2. In other words, this heat integrated distillation apparatus employs a thermo-siphon system, and hence no pressure-feeding means such as a pump is necessary for supplying the liquid from rectifying column 1 to stripping column 2 located above in a vertical direction.

With the above described apparatus configuration, which transfers heat from rectifying column 1 to stripping column 2 by using second pipe 24, third pipe 25 and heat exchanger 8, as compared with a distillation apparatus including no such heat transfer configuration, the heat exchanged rate removed from condenser 7 attached to the column top of rectifying column 1 can be reduced more, and the heat exchanged rate that is supplied to reboiler 3 attached to the column bottom of stripping column 2 can be reduced more. As a result, a distillation apparatus that is very high in energy efficiency can be provided.

Rectifying column 1 and stripping column 2 can be configured by using trayed sections or packed bed sections similar to those of a general distillation apparatus. Hence, the apparatus can deal with side cutting or multi-feed stream without the need for any improvement, and it is possible to easily perform maintenance of the apparatus. For the same reason, the number of stages of the rectifying column or the stripping column can be freely set, and a feed stage can be optimized.

A heat transfer area can be freely set, and hence the heat exchanged rate can be determined without any dependence on the temperature difference between the columns.

As described above, according to the apparatus example described in JP4803470B (FIG. 2), energy efficiency is high, side-cutting and setting of a feed stage position can be easily dealt with, and maintenance of the apparatus is easy. Further, the apparatus of the present invention has a structure in which a degree of freedom in design is high, and hence can be easily accepted by the user side.

Concerning the distillation apparatus shown in FIG. 2, the present inventors aim at further enhancement in energy efficiency, and consider that the distillation apparatus still has a room to be improved.

In other words, in the distillation apparatus shown in FIG. 2, the following method is adopted. Part or whole of the liquid in an arbitrary stage of stripping column 2 is withdrawn through pipe 24 outside the column, and is supplied to tube-bundle-type heat exchanger 8 located at an arbitrary stage of rectifying column 1, where heat exchange is performed. Thereafter, the liquid and vapor in heat exchanger 8 of rectifying column 1 pass through pipe 25 outside the column to return to directly below the above described liquid withdrawal position of stripping column 2 by the thermo-siphon effect, without being given energy from the outside by a pump or the like. Such circulation of the fluids is performed.

In such a method, a liquid head is needed at the supply side of tube-bundle-type heat exchanger 8 (pipe 24 outside the column) in order to perform circulation of the fluids by the thermo-siphon effect. In other words, as the portions extending in the vertical direction, of pipes 24 and 25 become long correspondingly to the distance (height) between liquid withdrawal position X from stripping column 2 and heat exchanger installation position Y of rectifying column 1, pressure loss through pipe 25 increases. Hence, in order to circulate the fluids by surpassing this, the liquid head based on the inlet position of heat exchanger 8 (end portion of pipe 24 connected with heat exchanger 8) also becomes large. In the tube of heat exchanger 8, however, the pressure becomes high and the boiling point increases due to the increase in the liquid head. Therefore, the temperature difference between the inside of the tube and the outside (shell) of the tube in heat exchanger 8 becomes small correspondingly to the increase of the boiling point. In order to compensate this, a necessity arises to increase the pressure of rectifying column 1, that is, to increase the temperature in rectifying column 1 by increasing the compression ratio of compressor 4. Thus, there is a room to be improved from the viewpoint of energy saving performance.

In addition, in the distillation apparatus shown in FIG. 2, such a state is brought about that the vapor rate and the liquid rate are small in the vicinity of column top 1c of rectifying column 1. In the vicinity of column bottom 1a of rectifying column 1, the vapor rate and the liquid rate are large. Thus, if the column diameter of rectifying column 1 is designed based on the vapor rate and the liquid rate in column bottom 1a of rectifying column 1, the column diameter becomes excessive in the vicinity of column top 1c. Meanwhile, such a state is brought about that in the vicinity of column top 2c of stripping column 2, the vapor rate and the liquid rate are large, and in the vicinity of column bottom 2a of stripping column 2, the vapor rate and the liquid rate are small. Therefore, as in the case of rectifying column 1, if the column diameter of stripping column 2 is designed based on the vapor rate and the liquid rate at column top 2c of stripping column 2, the column diameter becomes excessive in the vicinity of column bottom 2a. Therefore, there is also a room to be improved from the viewpoint of the structure and manufacturing cost.

SUMMARY OF THE INVENTION

An object of the present invention is to achieve further energy saving and reduction of manufacturing cost in the above described distillation apparatus (FIG. 2) to improve the aforementioned points.

A heat integrated distillation apparatus according to an aspect of the present invention includes: a rectifying column including a trayed section or a packed bed section, which is a column shell used as a rectifying section; a stripping column located above seen from the rectifying column and including a trayed section or a packed bed section, which is a column shell used as a stripping section; a first pipe for communicating a column top of the stripping column with a column bottom of the rectifying column; and a compressor installed in the first pipe and configured to compress vapor from the column top of the stripping column and then to feed the compressed vapor to the column bottom of the rectifying column. Further, the aspect of the present invention includes: a heat exchanger located at a predetermined stage of the rectifying column; a liquid withdrawal unit located at a predetermined stage of the stripping column and configured to withdraw a part of liquid from the predetermined stage to an outside of the column; a second pipe that introduces the liquid from the liquid withdrawal unit to the heat exchanger; and a third pipe that introduces fluids introduced through the second pipe to the heat exchanger and then discharged out of the heat exchanger to a stage directly below the liquid withdrawal unit of the stripping section.

In the heat integrated distillation apparatus according to the above aspect of the present invention, the fluids flow from the stripping column to the heat exchanger of the rectifying column through the second pipe. Heat is removed from the vapor of the rectifying column in the heat exchanger. Then, the heat can be transferred from the rectifying column to the stripping column through the third pipe. Further, the fluids flow from the stripping column to the rectifying column by gravity. The fluids in the heat exchanger are accordingly pushed to flow from the rectifying column to the stripping column. In other words, this heat integrated distillation apparatus of the aspect of the present invention employs a thermo-siphon system, and hence no pressure-feeding means such as a pump is necessary for supplying the liquid from the rectifying column to the stripping column located above in a vertical direction.

With the apparatus configuration which transfers heat from the rectifying column to the stripping column by using the second and third pipes and the heat exchanger as described above, as compared with a distillation apparatus including no such heat transfer configuration, the heat exchanged rate removed from a condenser attached to the column top of the rectifying column can be reduced more, and the heat exchanged rate that is supplied to a reboiler attached to the column bottom of the stripping column can be reduced more. As a result, a distillation apparatus that is very high in energy efficiency can be provided.

Further, the rectifying column and the stripping column are configured by using trayed sections or packed bed sections similar to those of a general distillation apparatus. Hence, the apparatus can deal with side cutting or multi-feed stream without the need for any special improvement, and it is possible to easily perform maintenance of the apparatus. For the same reason, the number of stages of the rectifying column or the stripping column can be freely set, and a raw material feed stage can be optimized.

Furthermore, a heat transfer area can be freely set, and hence the heat exchanged rate can be determined without any dependence on the temperature difference between the columns.

In addition, a feature of the aspect of the present invention lies in that the column bottom of the stripping column and the column top of the rectifying column are located in positions at a same column elevation. This makes the total length in the gravitational direction of the rectifying column and the stripping column shorter than that of the distillation apparatus shown in FIG. 2 and reduces the materials for production of the apparatus, and hence the manufacturing cost can be reduced.

Further, since the column bottom of the stripping column and the column top of the rectifying column are located in the positions at the same column elevation, as compared with the distillation apparatus shown in FIG. 2, a distance (height) between liquid introduction position X from the liquid withdrawal unit of the stripping column and heat exchanger installation position Y of the rectifying column becomes shorter, and portions extending in the vertical direction of the second and third pipes become shorter. As a result, a liquid head which is needed at the supply side (second pipe) of the heat exchanger to perform fluid circulation by the thermo-siphon effect becomes small. Since the pressure induced at a tube of the heat exchanger decreases correspondingly to the reduction of the liquid head, increase of the boiling point in the tube is suppressed to be low, and correspondingly to this, a large temperature difference can be easily taken between an inside of a tube and an outside (shell) of the tube in the heat exchanger. This enables further reduction in the pressure of the rectifying column, that is, reduction in a compression ratio of the compressor. Thus energy saving performance can be enhanced.

According to the present invention, energy efficiency is high, side-cutting and setting of a feed stage position can be easily dealt with, and maintenance of the apparatus is easy. Further, the apparatus of the present invention has a structure in which a degree of freedom in design is high, and hence can be easily accepted by the user side.

In addition, according to the present invention, further energy saving and reduction in manufacturing cost can be achieved.

The above and other objects, features and advantages of the present invention will become apparent from the following description with reference to the accompanying drawings which illustrate examples of the present invention.

Figure 1:
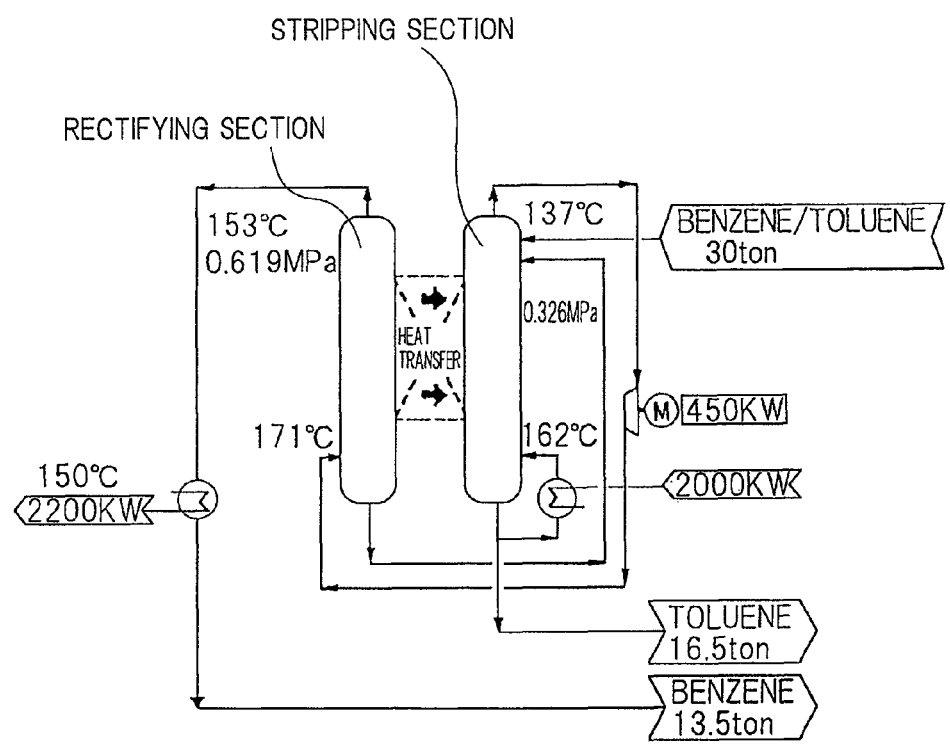
FIG. 1 shows a basic structure of HIDiC.

EXPLANATION OF LETTERS 1 rectifying column
1a column bottom
1b trayed section (or packed bed section)
1c column top
2 stripping column
2a column bottom
2b trayed section (or packed bed section)
2c column top
2d liquid withdrawal unit
2e liquid sump unit
3 heater (reboiler)
4 compressor
5 chimney tray for sump
6 pump
7 condenser
8 tube-bundle-type heat exchanger
5, 15 chimney tray for sump
9 chimney tray for sump
10, 12, 14 liquid
11, 13, 18 vapor
16 partition plate
17 control valve
21, 22, 23, 24, 25, 26, 27, 28, 29, 30, 31 pipe
41 partition wall
X a liquid withdrawal position from a stripping column
Y a heat exchanger installation position of a rectifying column

DETAILED DESCRIPTION OF THE EXEMPLARY EMBODIMENT

A heat integrated distillation apparatus according to the present invention has a basic feature in which a column shell (stripping column) that is used as a stripping section extending in a vertical direction, and a column shell (rectifying column) that is used as a rectifying section extending in the vertical direction are provided separately from each other, and the stripping column is located above seen from the rectifying column. A general distillation apparatus, which is not an internally heat integrated distillation apparatus, includes a column built in a vertical direction and having a column bottom, a trayed section (or packed bed section) and a column top, wherein at a boundary of feed location, an upper side of the trayed section (or packed bed section) is a rectifying section and a lower side is a stripping section, and is totally different from the heat integrated distillation apparatus according to the present invention. In particular, an arrangement described as follows is made by adding an improvement to the distillation apparatus shown in FIG. 2 that is proposed by the present applicant. Thus, an embodiment example of the present invention will be described by using the same reference signs for the same components as those shown in FIG. 2.

Figure 3:
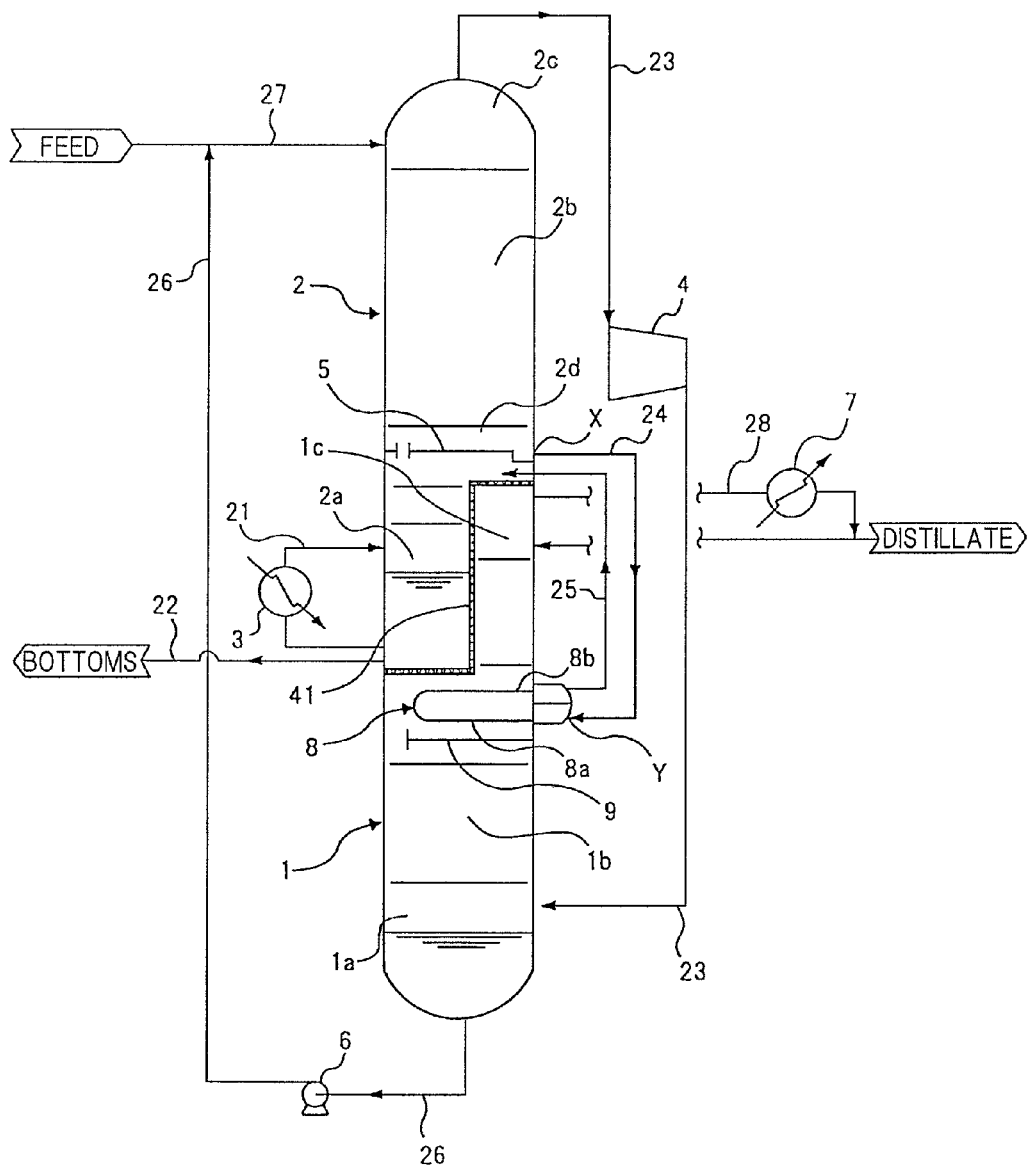
FIG. 3 shows an overall configuration of a heat integrated distillation apparatus according to one embodiment of the present invention.

FIG. 3 shows an overall configuration of a heat integrated distillation apparatus according to one embodiment of the present invention. The heat integrated distillation apparatus according to the present embodiment includes rectifying column 1 and stripping column 2 located above seen from rectifying column 1. Rectifying column 1 includes column bottom 1a, trayed section (or packed bed section) 1b, and column top 1c. Stripping column 2 also includes column bottom 2a, trayed section (or packed bed section) 2b, and column top 2c.

Trayed section 1b and 2b are sections where several horizontal trays are located therein. A tray on which vapor and liquid contact mutually is referred to as a stage. At each stage, gas-liquid contact promotes a mass transfer. As a result, a gas phase having rich in components with higher volatility ascends to an upper stage, while a liquid phase having rich in components with lower volatility descends to a lower stage. Then, gas-liquid contact is executed again with a new liquid phase or gas phase there for further mass transfer. Thus, there are components in rich with higher volatility at a higher stage of the column, there are components in rich with lower volatility at a lower stage, and a distillation operation is accomplished.

The packed section that can replace the trayed section is a section where a certain packing is installed in the empty column, and gas-liquid contact is executed on its surface. By the same mechanism as that of the trayed column, there are components in rich with higher volatility at a higher part, there are components in rich with lower volatility at a lower part, and a distillation operation is accomplished. In FIG. 3, trayed sections 1b and 2b (or packed bed sections) are shown as blank. In reality, however, the abovementioned structures are employed.

Figure 2:
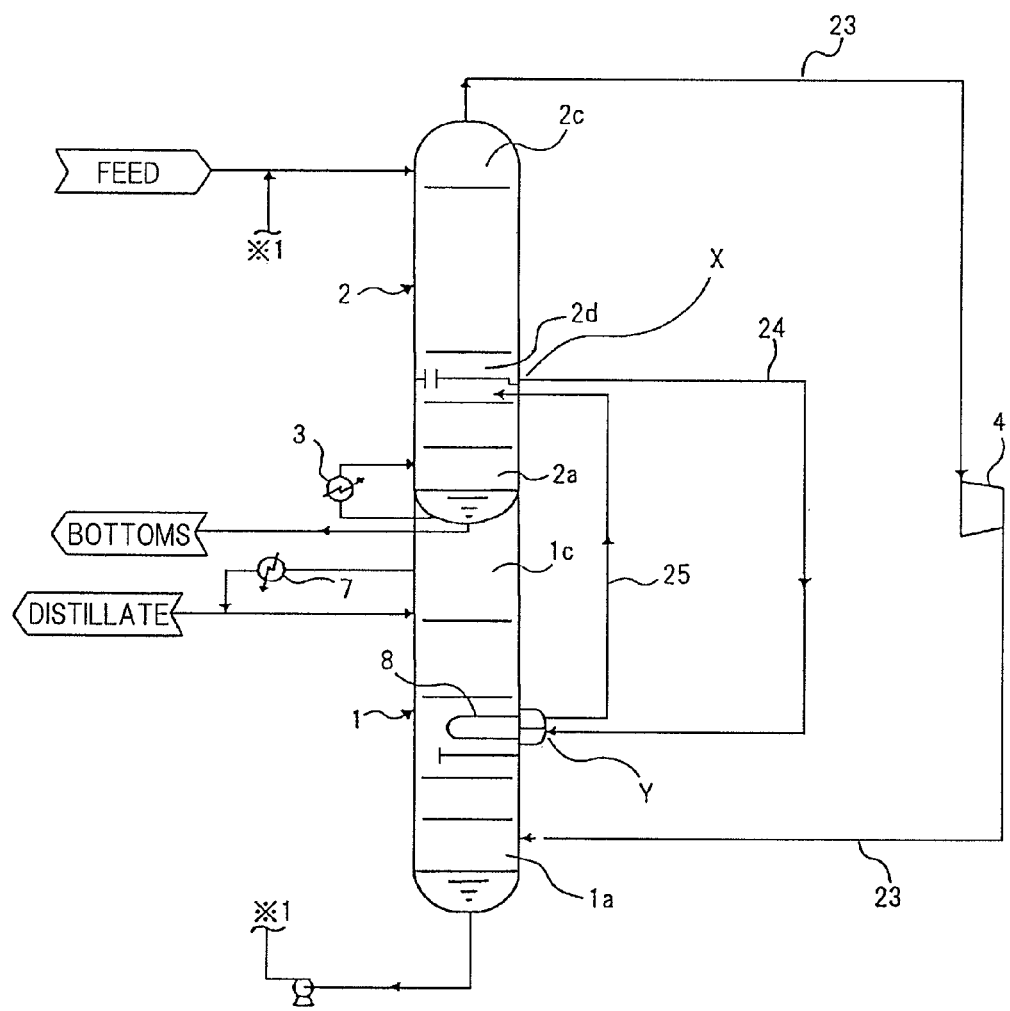
FIG. 2 is a schematic configuration diagram showing an example of a distillation apparatus disclosed in JP4803470B that is a related art relating to the present application.

As a configuration differing from the distillation apparatus of FIG. 2, column bottom 2a of stripping column 2 and column top 1c of rectifying column 1 are formed in laterally aligned positions. More specifically, partition wall 41 to which heat insulation is applied is installed in an intermediate portion in a lengthwise direction inside one column, and thereby stripping column 2 and rectifying column 1 are configured in a gravitational direction. Further, wall 41 partitions the inside of the one column so that column bottom 2a of stripping column 2 and column top 1c of rectifying column 1 are located in positions at the same column elevation.

Each of rectifying column 1 and stripping column 2 is described in detail. First, stripping column 2 is described.

Heater 3 referred to as a reboiler is disposed outside column bottom 2a of stripping column 2, and pipe 21 is provided from a lower space part of column bottom 2a through heater 3 to an upper space part of column bottom 2a. Liquid descending through trayed section 2b (or packed bed section) of stripping column 2 accordingly stays at column bottom 2a. A part of the liquid is heated by heater 3 to become vapor, and returns to column bottom 2a. From the bottommost part of column bottom 2a, liquid in rich with lower volatility components is acquired through pipe 22.

Column top 2c of stripping column 2 is a position for supplying feed stream. Column top 2c is connected, via compressor 4, to column bottom 1a of rectifying column 1 by using pipe 23. According to an embodiment, the feed stream is supplied at the top of column 2c of stripping column 2. However, the feed stage can be an arbitrary stage of trayed section 2b (or packed bed section). Even when there is a plurality of raw materials, the feed stage can be column top 2c of stripping column 2 and other arbitrary stages (including a stage of rectifying column 1).

Figure 4:
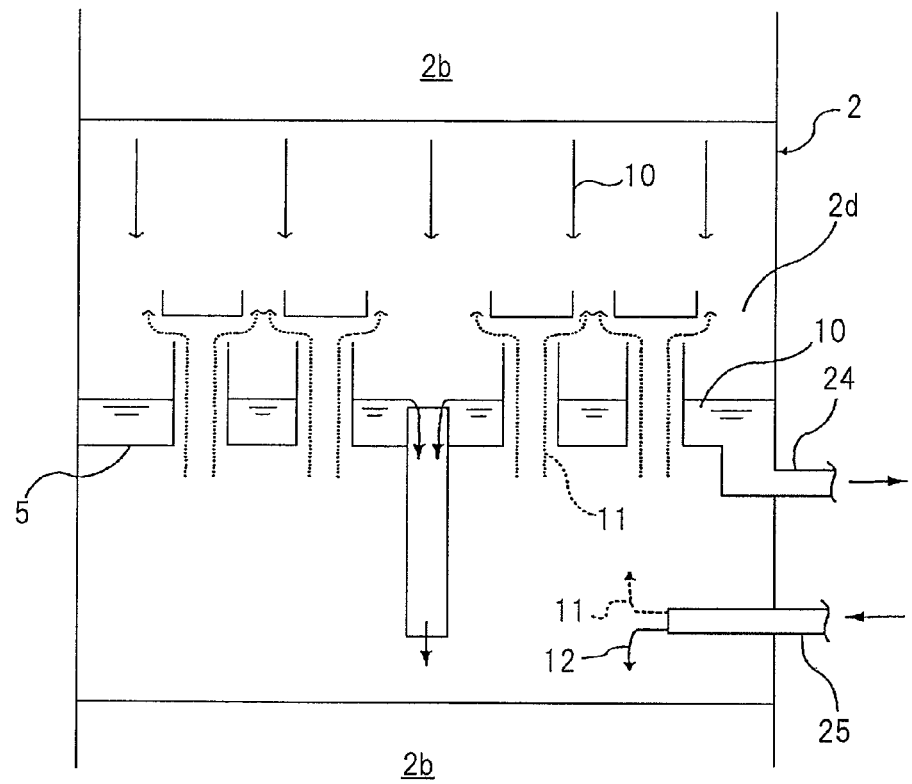
FIG. 4 shows a configuration of a liquid withdrawal unit shown in FIG. 3.

In addition, trayed section 2b (or packed bed section) of stripping column 2 includes liquid withdrawal unit 2d at a predetermined stage. As shown in FIG. 4, liquid withdrawal unit 2d holds liquid 10 descending from an upper part of stripping column 2 at chimney tray for sump 5, and withdraws a part of liquid 10 from stripping column 2. Pipe 24 for directing a part of liquid 10 to rectifying column 1 is connected to liquid withdrawal unit 2d. Pipe 25 from rectifying column 1 is inserted through a shell wall of stripping column 2 into a stage directly below liquid withdrawal unit 2d. From pipe 25 inserted into the stage directly below liquid withdrawal unit 2d, fluids having a mixture of vapor 11 and liquid 12 are introduced as described below, and vapor 11 ascends while liquid 12 descends.

Rectifying column 1 is described.

One end of pipe 26 is connected to a bottommost part of column bottom 1a of rectifying column 1, while the other end of pipe 26 is connected to pipe 27 for supplying feed materials to column top 2c of stripping column 2. To recycle the liquid staying at column bottom 1a of rectifying column 1 to column top 2c of stripping column 2 located higher than rectifying column 1, pump 6 is necessary at the midway section of pipe 26.

Condenser 7 is equipped outside column top 1c of rectifying column 1, and pipe 28 is connected from an upper space part of column top 1c to condenser 7. Thus, vapor that has withdrawn from column top 1c of rectifying column 1 is cooled by the condenser 7 to become liquid, and a distillate liquid having components with higher volatility is acquired. A part of the liquid is refluxed to column top 1c.

In addition, tube-bundle-type heat exchanger 8 is inserted into a predetermined stage of trayed section 1b (or packed bed section) of rectifying column 1. A parallel tube portion in a U-shaped tube of tube-bundle-type heat exchanger 8 is equipped along chimney tray for sump 9 for temporarily holding a condensed liquid and re-distributing vapor ascending from below. Lower tube portion 8a of the parallel tube portion is connected to pipe 24 connected to liquid withdrawal unit 2d of stripping column 2. Upper tube portion 8b is connected to pipe 25 that is inserted into the stage directly below liquid withdrawal unit 2d.

An operation of tube-bundle-type heat exchanger 8 is described.

Figure 5:
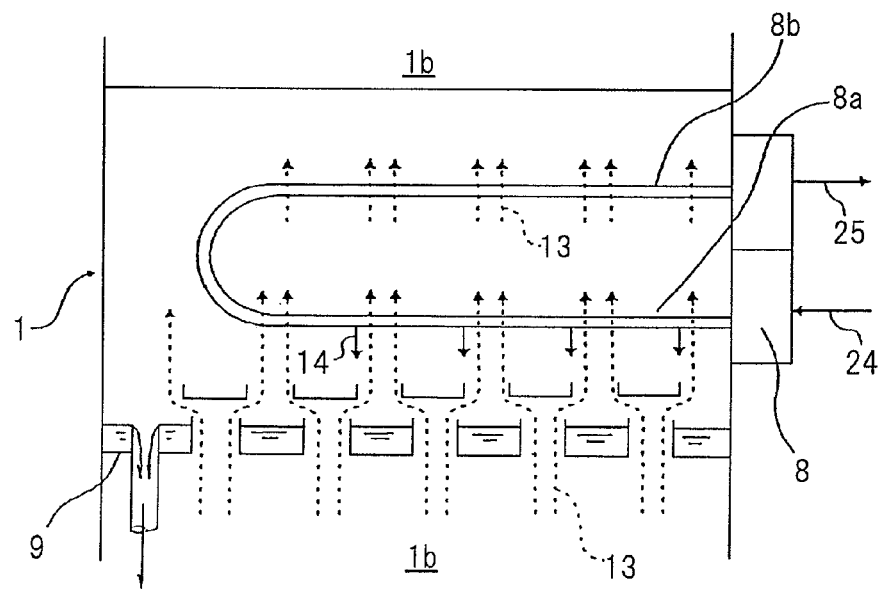
FIG. 5 shows a peripheral configuration of a tube-bundle-type heat exchanger located in a rectifying column shown in FIG. 3.

In the apparatus, the pressure and temperature of vapor out of column top 2c of stripping column 2, that is to be supplied to column bottom 1a of rectifying column 1, is increased by compressor 4. Vapor 13 (refer to FIG. 5), whose temperature increased, is introduced to trayed section 1b where it ascends and comes into contact with the U-shaped tube of tube-bundle-type heat exchanger 8. In this case, liquid at an arbitrary stage of stripping column 2 is introduced through pipe 24 to lower tube portion 8a of heat exchanger 8. Thus, the liquid in tube portion 8a is heated by the heat of vapor 13, and a part of vapor 13 in contact with tube portion 8a is condensed and becomes liquid 14 which descends. Upper tube portion 8b of heat exchanger 8 is also heated by the heat of vapor 13. Thus, the liquid introduced through pipe 24 into heat exchanger 8 changes into fluids having a mixture of a liquid phase and a gas phase while moving from lower tube portion 8a to upper tube portion 8b. The fluids then pass through pipe 25 outside the column to be introduced to the stage directly below liquid withdrawal unit 2d of stripping column 2 (refer to FIG. 3). For circulating of such fluids, no pressure-feeding means such as a pump is necessary because the configuration employs the thermo-siphon system.

In other words, because liquid withdrawal unit 2d of stripping column 2 is connected to lower tube portion 8a of heat exchanger 8 of rectifying column 1 via pipe 24 and because upper tube portion 8b of heat exchanger 8 of rectifying column 1 is connected to the stage directly below liquid withdrawal unit 2d of stripping column 2 via pipe 25, the liquid descends from stripping column 2 to rectifying column 1 by gravity. As a result, gravity causes the fluids to flow from rectifying column 1 to stripping column 2 even when there is no pump.

As described above, according to the embodiment, the heat can be removed from the vapor in rectifying column 1 by heat exchanger 8, and transferred from rectifying column 1 to stripping column 2 through pipe 25. A heat transfer system using pipes 24 and 25 and heat exchanger 8, as in the case of the embodiment, is configured as if a side condenser is installed at an arbitrary stage of rectifying column 1 and, simultaneously, as if a side reboiler is installed at an arbitrary stage of stripping column 2. Thus, as compared with a distillation apparatus that includes no such heat transfer system, the amount of heat that has been removed can be reduced at condenser 7 of rectifying column 1, and the amount of heat that has been supplied can be reduced at reboiler 3 of stripping column 2. As a result, a high energy saving distillation apparatus can be achieved.

FIG. 1 shows only one heat transfer system. However, the number of heat transfer systems equivalent to 10 to 30% of the total number of theoretical stages can be installed. Needless to say, the number of heat transfer systems to be installed and locations of the heat exchanger and the pipes can be arbitrarily determined according to a design specification.

Further, in the present invention, as shown in FIG. 3, for example, partition wall 41 which divides the one column into rectifying column 1 and stripping column 2 partitions the inside of the column so that a space of column bottom 2a of stripping column 2 and a space of column top 1c of rectifying column 1 are located in the positions at the same column elevation. Thereby, the total length in the gravitational direction of rectifying column 1 and stripping column 2 becomes shorter than the distillation apparatus of FIG. 2. Further, by the partitioning manner at the aforementioned wall 41, a sectional area in a lateral direction in column top 1c of rectifying column 1 is made narrower than a sectional area in the lateral direction of a site other than column top 1c, and a sectional area in a lateral direction in column bottom 2a of stripping column 2 is made narrower than a sectional area in the lateral direction of a site other than column bottom 2a. Therefore, column spaces of rectifying column 1 and stripping column 2 have sizes efficiently, which are suitable to the vapor rate and the liquid rate inside the section. From the above, the materials for producing the apparatus is reduced more, and the manufacturing cost can be reduced more than the distillation apparatus shown in FIG. 2.

Further, since the space of column bottom 2a of stripping column 2 and the space of column top 1c of rectifying column 1 are located in the positions at the same column elevation, as compared with the distillation apparatus shown in FIG. 2, the distance (height) between liquid withdrawal position X from stripping column 2 and heat exchanger installation position Y of rectifying column 1 becomes shorter, and portions extending in the vertical direction of pipes 24 and 25 become shorter. As a result, a liquid head which is needed at the supply side (pipe 24 outside the column) of heat exchanger 8 to perform fluid circulation by the thermo-siphon effect becomes small. Since the pressure that is induced at a tube of heat exchanger 8 decreases correspondingly to the reduction of the liquid head, increase of the boiling point in the tube is suppressed to be low, and correspondingly to this, a large temperature difference can be easily taken between an inner side of the tube and an outer side (shell) of the tube in heat exchanger 8. This enables further reduction in the pressure of rectifying column 1, that is, reduction in a compression ratio of compressor 4, and can enhance energy saving performance.

The heat integrated distillation apparatus described above is configured by using the trayed column or the packed column similar to that of the general distillation apparatus. This enables side-cutting or multi-feeding without any need to improve the apparatus, and easy maintenance of the apparatus. For the same reason, freedom for setting the numbers of stages for the rectifying column and the stripping column enables optimization of feed stages. In other words, the present invention can solve problems 1) to 5) of the heat integrated distillation apparatus using the double-pipe structure represented by JP2004-16928A.

According to the above described embodiment, tube-bundle-type heat exchanger 8 is used as the component of the heat transfer system that transfers heat from rectifying column 1 to stripping column 2. This enables free changing of the heat transfer area A based on a tube design of heat exchanger 8. Thus, in order to determine the amount of heat that is to be exchanged between rectifying column 1 and stripping column 2, not only the temperature difference ΔT between rectifying column 1 and stripping column 2 but also the heat transfer area A can be freely set. The present invention can therefore solve problem 6) of the heat integrated distillation apparatus using the double-pipe structure.

The preferred embodiments of the present invention have been described. However, the embodiments are in no way limitative of the present invention. Needless to say, various changes can be made to the present invention within its technical teachings.

According to the above described embodiment, rectifying column 1 and stripping column 2 are connected to each other in the vertical direction. However, the present invention is not limited to this arrangement. In other words, the present invention includes an arrangement where rectifying column 1 and stripping column 2 are configured separately and independently, and column bottom 2a of stripping column 2 and column top 1c of rectifying column 1 are located in the positions at the same column elevation (laterally aligned positions).

While preferred embodiments of the present invention have been described using specific terms, such description is for illustrative purposes only, and it is to be understood that changes and variations may be made without departing from the spirit or scope of the following claims.

What is claimed is:
1. A heat integrated distillation apparatus comprising:
 a rectifying column including a trayed section or a packed bed section, which is used as a rectifying section;
 a stripping column located higher than said rectifying column and including a trayed section or a packed bed section, which is used as a stripping section;
 a first pipe that connects a top space of said stripping column with a bottom space of said rectifying column;

a compressor installed in said first pipe and configured to compress vapor from the top space of said stripping column and then feeding the compressed vapor to the bottom space of said rectifying column;

a heat exchanger located at the trayed section or the packed bed section of said rectifying column;

a liquid withdrawal unit located at the trayed section or the packed bed section of said stripping column and configured to remove a part of liquid from the trayed section or the packed bed section of said stripping column to an outside of the column;

a second pipe that introduces the liquid from said liquid withdrawal unit to said heat exchanger; and a third pipe that introduces fluids introduced through said second pipe to said heat exchanger and then discharged from the heat exchanger, to a stage directly below said liquid withdrawal unit of the stripping section, wherein a bottom space of said stripping column and a top space of said rectifying column are located in positions at a same column elevation.

2. The heat integrated distillation apparatus according to claim 1, wherein said rectifying column and said stripping column are formed by a partition wall that divides an inside of one column into two, and the partition wall partitions the inside of the column so that the bottom space of said stripping column and the top space of said rectifying column are located in the positions at the same column elevation.

3. The heat integrated distillation apparatus according to claim 1, further comprising a raw material supply pipe that supplies a raw material to at least one of the top space of said stripping column and one of the trayed section of said stripping column and the packed bed section of said stripping column.

4. The heat integrated distillation apparatus according to claim 3, further comprising a pump and a pipe that pressure-feeds liquid in the bottom space of said rectifying column to said raw material supply pipe.

5. The heat integrated distillation apparatus according to claim 1, further comprising a reboiler that heats liquid in the bottom space, outside the bottom space of said stripping column.

6. The heat integrated distillation apparatus according to claim 1, further comprising a condenser that cools vapor in the top space, outside the top space of said rectifying column.

* * * * *